Dec. 9, 1947.   F. F. DERN, JR., ET AL   2,432,229
COMPENSATING MEANS FOR DIMENSIONAL CHANGES IN A RECORDER CHART
Filed Nov. 30, 1945   2 Sheets-Sheet 1
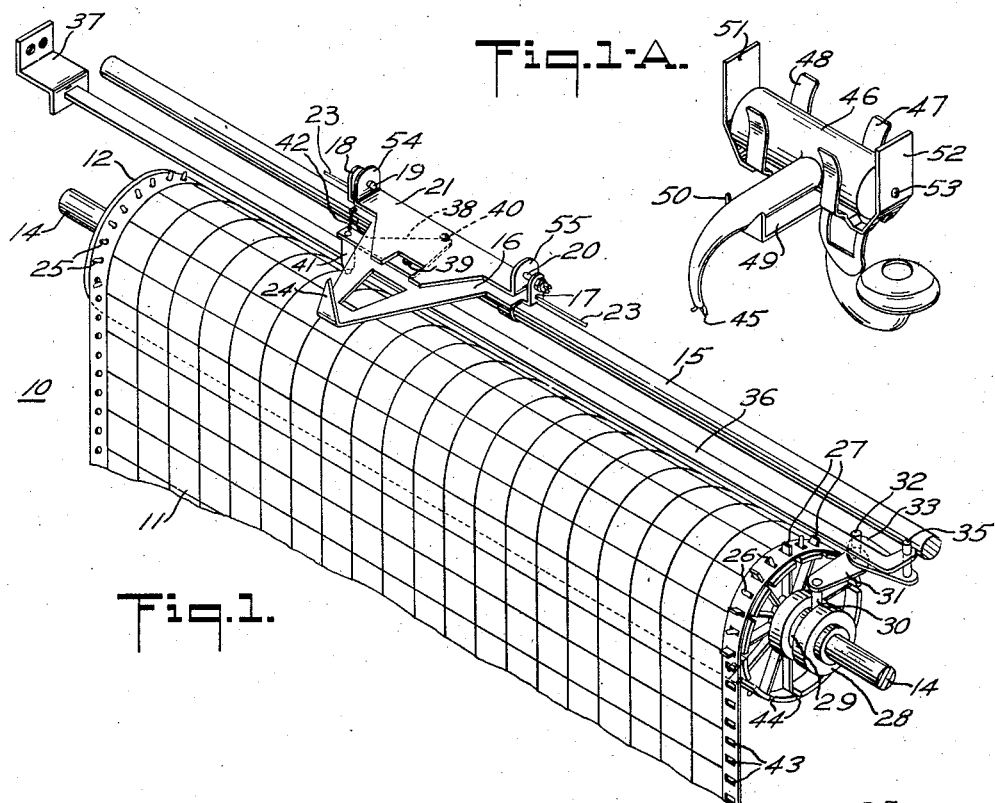
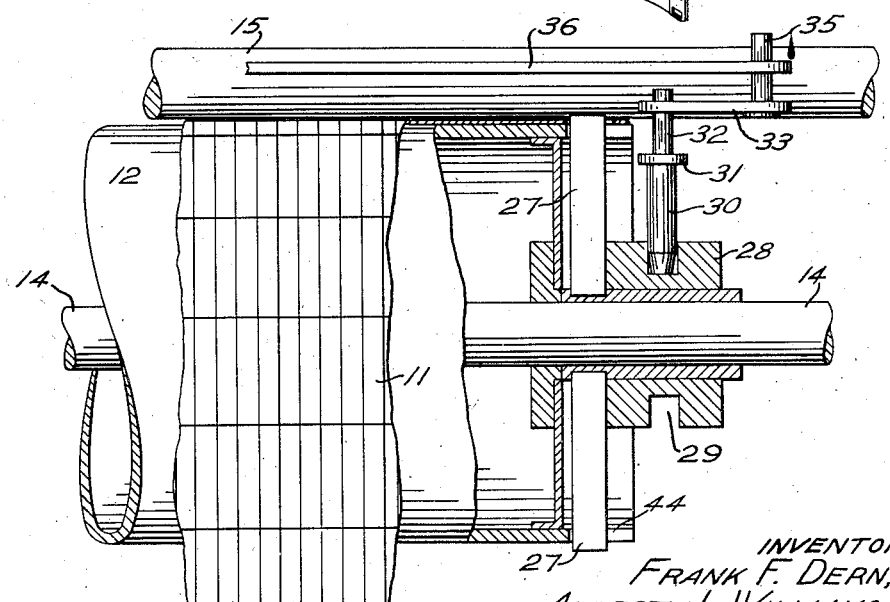
INVENTORS
FRANK F. DERN, JR.
ALBERT J. WILLIAMS, JR.
BY
Virgil E. Woodcock
ATTORNEY Dec. 9, 1947.  F. F. DERN, JR., ET AL  2,432,229
COMPENSATING MEANS FOR DIMENSIONAL CHANGES IN A RECORDER CHART
Filed Nov. 30, 1945  2 Sheets-Sheet 2

INVENTORS
FRANK F. DERN, JR.
ALBERT J. WILLIAMS, JR.
BY
Virgil E. Woodcock
ATTORNEY Patented Dec. 9, 1947

2,432,229

UNITED STATES PATENT OFFICE 2,432,229

COMPENSATING MEANS FOR DIMENSIONAL CHANGES IN RECORDER CHARTS

Frank F. Dern, Jr., Willow Grove, and Albert J. Williams, Jr., Philadelphia, Pa., assignors to Leeds and Northrup Company, Philadelphia, Pa., a corporation of Pennsylvania Application November 30, 1945, Serial No. 632,070

7 Claims. (Cl. 234—71)

This invention relates to recording instruments of the type in which a marker is movable across a record chart graphically to record magnitudes of a condition, and has for an object the provision of compensating means for eliminating errors due to dimensional changes in the chart caused by ambient conditions.

It has heretofore been recognized that a chart is subject to dimensional changes as the humidity or other ambient conditions vary. If the chart has been calibrated under predetermined humidity conditions, the spacing between graduations on the chart will differ under other ambient conditions. It has been proposed to change the position of the marker relative to the chart by a feeler biased against the edge of the chart, which is moved by the chart to alter the position of the marker. The difficulty with systems employing compressional forces on the chart is that as the humidity increases, the paper chart approaches a "limp" condition and therefore cannot serve accurately to move or control the element which is applying such compressional forces thereto. In other words, in order to maintain accuracy between the marker and the calibrations on the chart, the mechanical system should respond only to the elongation or contraction of the chart which is due to the different humidity conditions, and should not in any way respond to movement of the chart due to the application of the biasing means. Thus, it will be seen that if compressional forces are applied to a chart under high humidity conditions, the chart loses its ability to resist the applied force and thus at the time the correction is most needed there is the greatest likelihood of its failure.

In carrying out the present invention in one form thereof, there is provided a mechanical compensating means which normally places the chart under light tension so that the mechanical arrangement is equally effective under high humidity conditions as under low humidity conditions. More particularly, there is provided means for anchoring one side of the chart, while at the other side of the chart a floating sprocket engages the sides of a plurality of holes. The sprocket has teeth which engage the sides of the openings in the chart to apply tension thereto, and it also actuates the linkage which effects proportional adjustment of the position of the marker to correct for that degree of elongation and contraction due to existing humidity conditions at the location of the marker.

For a more detailed understanding of the invention, and for further objects and advantages thereof, reference is to be had to the following description taken in conjunction with the accompanying drawings in which:

Fig. 1 is a fractional perspective view of a recorder embodying the invention, the pen and its frame being omitted;

Fig. 1—A is a perspective view of the marker or pen and its frame;

Fig. 2 is an enlarged fractional view, partly in section of the chart-engaging sprocket and associated linkage;

Figure 3:
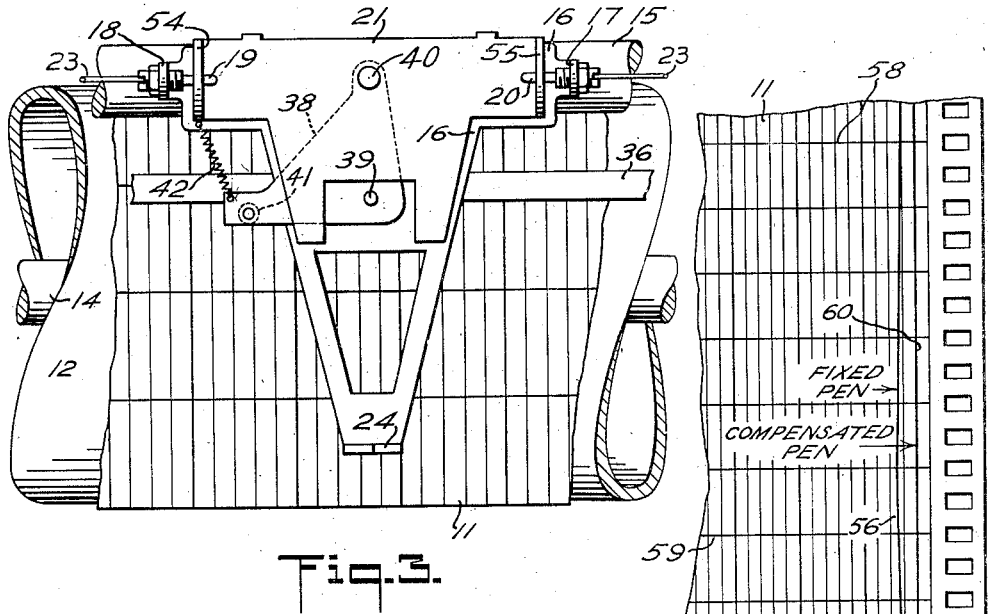
Fig. 3 is a plan view, partly in section of the carriage and the slidable marker-support.

Referring to the drawings, the invention in one form has been shown applied to a recorder 10 provided with a strip-chart 11 supported on a driving roll 12. The roll 12 is provided with a shaft 14 rotatably supported in journals (not shown) and driven by suitable driving mechanism (not shown). For further details of the recorder including the chart driving means, reference may be had to Ross et al. Patent 2,074,118. As shown in Fig. 1, a track 15 extends above and parallel to the axis of the driving roll 12 for the support of a carriage 16. Supported from up-turned ears 17 and 18 is a pair of pins 19 and 20 on which a pen-support 21 is slidably mounted. For the sake of clarity, the pen itself has been omitted in Fig. 1; it is shown in the operating position in Fig. 5 of the aforesaid Ross et al. patent, and it is also shown in Fig. 1—A hereof. The carriage 16 is driven between predetermined limits by any suitable means, such as a violin string 23, Figs. 1, 3 and 4. The violin string may be driven by any suitable mechanism, such as the mechanical relay described in the aforesaid Ross et al. patent.

The operation is such that the position of a pointer 24 accurately indicates with reference to a fixed scale (not shown) the magnitude of a condition. Such a scale may be conveniently made of metal which will not be dimensionally affected by ambient conditions, particularly humidity. Heretofore, it has been intended that a marker or pen shall be driven laterally of the strip-chart 11, to record magnitudes of a condition and with corresponding accuracy. The difficulty has been that the chart dimensionally changes with ambient conditions, particularly with humidity, so that like magnitudes of conditions will produce, under different conditions of humidity, records on the chart which are laterally displaced with respect to each other.

In accordance with the invention, one side of the drive roll 12 is provided with a plurality of pins 25 which serve to anchor one side of the chart against movement due to ambient conditions and which also serve to drive the chart. The opposite end of the drive roll 12 is provided with a series of drive pins 26 disposed circumferentially of the roll 12 and which alternate with the spokes 27 of a sprocket 28 which is freely and slidably mounted on the shaft 14. The sprocket 28 includes a hub member provided with a rectangular groove 29 into which there is disposed a pin 30, the lower end of the pin 30 being tapered to insure its entry into the groove 29. The pin 30 has its opposite end secured to one end of arm 31 of a bell crank comprising the arm 31, which at its opposite end is secured to a rotatable shaft 32, and a link 33 secured at one end to said shaft 32, and having the opposite end thereof secured to a pin 35 which is pivotally connected to a pen-actuating bar 36. The actuating bar 36 has an L-shaped end adjacent the pin 35 and extends generally parallel to the axis of the driving roll 12, with its opposite end supported by a bracket 37. As illustrated, the left-hand end of the bar 36 as viewed in Fig. 1 slides within a slot in the down-turned end of the bracket 37, which slot also permits pivotal movement thereof.

It will be remembered the support 21 for the marker or pen is slidably mounted on the pins 19 and 20. To predetermine its position with respect to the pins 19 and 20, there is provided a fixed pivot 39 connecting it to the pen carriage 16. One end of the crank 38 is connected by a pivot 40 to the support 21, while the opposite end has a pin and roller assembly 41 which extends downwardly into engagement with the actuating bar 36. A tension spring 42 connected to the end of the crank adjacent to the pin and roller assembly 41 and at its opposite end to the carriage 16 performs two functions. It maintains the roller assembly 41 against the actuating bar 36 and thereby predetermines the position of the pen-support 21 on the carriage pins 19 and 20. It also applies a bias to the actuating member 36 which is transmitted through the pin 35, crank 31—33, the pin 30 and to the sprocket 28. Accordingly, the sprocket 28 and its spokes 27 are biased in a direction to place the chart or record sheet 11 under slight tension.

When the actuating bar 36 is held by the crank 31—33 in a position parallel to the axis of the drive roll 12, the carriage 21 for the marker or pen may be driven across the chart without any change in the relative position of the support 21 with respect to the carriage 16. If the crank 31—33 moves the actuating bar 36 in a counter-clockwise direction about its pivot in the bracket 37, it will be seen that the spring 42 will be effective to produce a slight movement of the roller assembly 41 in a clockwise direction, thus moving the pen-support 21 to the right with respect to the carriage 16. The extent of the relative movement is proportional to the position of the pen carriage with respect to the chart. Thus, when the carriage is adjacent the anchored end of the chart 11, the pin-support 21 occupies substantially the same position as when the bar 36 is parallel to the axis of the drive roll 12. As the carriage moves to the right, as viewed in Fig. 1, the crank arm 38 is rotated in a clockwise direction by a progressively increasing amount, thereby gradually changing the position of the pen-support 21 with respect to the carriage 16.

The movement of the crank 31—33 and of the actuating bar 36 is under the direct control of the chart 11. It will be remembered that the spokes 27 are disposed within the alternate openings 43 of the chart, and it will be further observed that the end of the drive roll 12 is provided with a plurality of slots 44 to provide a castellated end within which the spokes 27 are slidably mounted. The bias on the spokes developed by the spring 42 causes them to engage the outer edges of the holes or openings 43 in the chart 11 to place it under slight tension. Accordingly, as ambient conditions change, such as humidity, the chart 11 will elongate or contract lengthwise of the drive roll 12. Since one end thereof is anchored by the drive pins 25, the end engaged by the spokes 27 will be moved as a result of such elongation and contraction.

Strip charts of the type used on recorders, though of extremely high-grade paper, are nevertheless thin. In consequence, under high humidity conditions such charts tend to go "limp"; that is, they lose the ability to resist a compressional force or to apply one. However, by placing the chart in tension, the elongation or contraction thereof due to humidity may be readily and accurately transmitted through the spokes 27 and the crank arm 31—33 to the actuating bar 36, thereby to so position the pen-support 21 with respect to the carriage 16 as to correct for the changes in the spacing of the calibrations due to the elongation of the chart.

It may be further observed that the driving pins 26 which alternate with the spokes 27 do not restrain the chart 11 from lateral movement with respect to the guide roll 12 since the pins 26 are round and are disposed within the rectangular openings or holes 43 of the chart 11. The pins 26 are effective in assisting the pins 25 in driving the strip chart 11, but because of end-clearances they do not interfere with operation of the marker-adjusting mechanism described.

Figure 4:
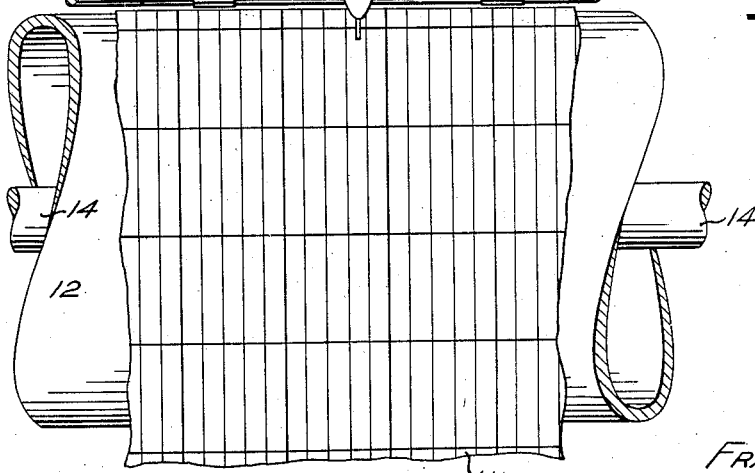
Fig. 4 is an elevation, partly in section, of Fig. 3 and showing part of the pen.

The pin 45 is shown in perspective in Fig. 1—A and a fractional part of it appears in Fig. 4. The pen itself includes a reservoir 46 mounted in clips 47 and 48 extending upwardly from a frame 49. A forwardly projecting end of the frame has a V-shaped notch 50 which serves definitely to locate the position of the pen 45. Two resiliently upturned ends 51 and 52 of the frame 49 are provided with openings into which may project the pins 19 and 20 of the carriage 16. One of these openings, the opening 53, is shown at the upturned end 52. Preferably these openings are large enough to provide mechanical clearance around the pins 19 and 20. The upturned ends 51 and 52 bear against the upturned ends 54 and 55 of the pen-support 21. There is enough weight forwardly of the pins 19 and 20 to bias the pen 45, by gravity, against the chart 11.

Figure 5:
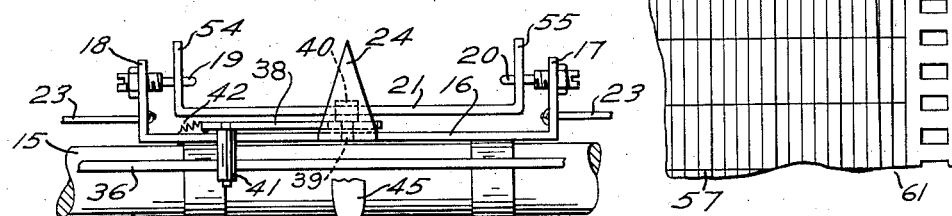
Fig. 5 is a fractional view of the chart illustrating records made with and without the invention.

Referring to Fig. 5, a fractional part of a strip chart 11 has been illustrated bearing a record made with and without the present invention. The line 56 was drawn by a pen held stationary on the carriage track 15. During the time interval represented by the spaced between horizontal lines 57 and 58 of the chart, the relative humidity was varied from 40% to a maximum of 80% at the time indicated by the horizontal line 59 and was then returned to 40% at the time indicated by the line 58. The fixed pen did not draw a straight line for the reason that the strip chart 11 expanded or elongated in a direction away from its fixed or anchored end. Its movement to the right, as viewed in Fig. 5, caused a substantial relative displacement between it and the fixed pen. The record line 60 was drawn by a pen mounted on the support 21 in accordance with the present invention. In this case, the pen carriage 16 was held in a fixed position with respect to the track 15 so that the pen drew the line 60 which coincides with one of the vertical lines of the chart, namely, the line 61. Notwithstanding the relative humidity increased from 40% to 80% and thereafter was returned to 40%, the action of the sprocket 28 and the corrective mechanism including the bar 36 and the spring 42, proportionately varied the position of the pen support 21 with respect to the carriage 16 in amount exactly to compensate for the expansion or elongation of the strip chart 11. As is evident from Fig. 5, the line 60 is linear and throughout the period of changing relative humidity its trace coincides with that of line 61.

To produce the linearity of the trace, notwithstanding the relative lateral movement of the strip chart 11 with respect to the drive roll 12, the corrective mechanism functioned during the increasing relative humidity to move the pen and the pen support 21 in the same direction as the humidity caused the chart to move, whereas during the period between the horizontal lines 59 and 58 the mechanism produced an opposite movement of the pen support 21 though in the same direction as the humidity caused the chart to move. In accordance with the invention, the pen or marker at all times correctly records on the chart the magnitude of the condition under measurement regardless of whether the chart is expanding or contracting because of ambient conditions.

The invention also permits the strip chart to be printed and perforated under any existing ambient conditions of humidity and avoids the need to provide accurate control of such ambient conditions. Heretofore, such ambient conditions, such as relative humidity, have had to be maintained within predetermined limits during the printing and perforating of the strip chart. So long as the printing and perforating operations on the chart are conducted under the same ambient conditions, the chart when used with a recorder embodying this invention will give a correct record regardless of the ambient conditions under which the record is made.

While a preferred embodiment of the invention has been described, it will be understood that variations may be made without departing from the spirit and scope of the invention as set forth in the appended claims.

What is claimed is:

1. In a recording instrument having a rotatable support for a record chart arranged to receive a record between graduations appearing between predetermined limits thereof and a marker for said chart, the combination of anchoring means for one portion of the chart, slidable means having a plurality of projections for engaging holes in another portion of the chart, means operable upon movement of said slidable means by elongation and contraction of the chart to change the position of said marker by an amount which corrects for change in the spacing of said graduations thereby to maintain accuracy of the record with respect to said graduations notwithstanding the direction or magnitude of the changes in said spacing due to said contraction and elongation of the chart from the anchored portion thereof, and biasing means acting on said slidable means in a direction to maintain the chart in lateral tension from the anchored end thereof.

2. In a recording instrument having a rotatable support for a record chart arranged to receive a record between graduations disposed between predetermined limits thereof and a marker for producing a record on said chart, the combination of a plurality of driving pins disposed adjacent one of said limits thereof for engaging holes in the chart thereby to anchor against lateral movement caused by changing ambient conditions that portion of the chart which engages said pins, slidable means having a plurality of spokes disposed within laterally elongated openings of said chart for engaging corresponding sides thereof, a carriage, a marker-support slidably mounted on said carriage and operable upon movement of said slidable means by elongation and contraction of said chart to change the position of said marker relative to the chart by an amount which corrects for change in the spacing of said graduations thereby to maintain accuracy of the record with respect to said graduations, and biasing means for applying through said spokes a force which maintains the chart in lateral tension.

3. In a recording instrument having a strip chart arranged to receive a record between graduations appearing between predetermined limits thereof and a marker for producing said record on said chart, the combination of a drive roll for said record chart having a plurality of driving pins disposed adjacent one side thereof for engaging a plurality of holes in the record chart to anchor it against lateral movement and to drive it, said roll having a less number of driving pins at the opposite end thereof for engaging laterally elongated openings in said chart for driving it and to permit free lateral movement thereof, slidable means having a plurality of spokes disposed between a number of the driving pins at said last-named end of said roll, said end of said roll being slotted to permit lateral movement of said spokes relative to said roll, a carriage track adjacent said roll, a carriage slidably mounted on said track, a pen support slidably mounted on said carriage, a crank arm interconnecting said carriage and said pen support, an actuating bar pivoted adjacent the anchored end of said chart and arranged to cooperate with one end of said crank arm, means interconnecting said slidable means and the free end of said actuating bar for rotating said crank arm in response to elongation and contraction of said chart to maintain accuracy of the record with respect to said graduations notwithstanding dimensional changes produced by elongation and contraction of said chart from the anchored side thereof, and biasing means between said crank arm and said carriage for transmitting to said spokes a force which maintains the chart in lateral tension from the anchored end thereof.

4. In a recording instrument having a rotatable support for a record chart having graduations between predetermined limits for receiving a record of magnitudes of a condition and a marker for said chart movable between predetermined limits in accordance with variations in the magnitude of said condition, the combination of means adjacent one of said limits and at one side of said chart for anchoring that side of the chart against lateral movement and to assure its movement toward and away from the other side of said chart as a result of elongation and contraction thereof due to changing ambient conditions, slidable means having a plurality of spokes nesting within a plurality of openings adjacent the other limit of said chart, and means operable upon movement of said slidable means by elongation and contraction of said chart for so correcting the position of said marker with respect to said graduations as to maintain accuracy of the record with respect to said graduations notwithstanding the extent of contraction or elongation of said chart, said last-named means including a spring which is effective to bias said slidable means and its spokes in a direction to maintain said chart in tension.

5. Means for correcting the position of a marker with respect to graduations on a chart changed by expansion or contraction thereof, which comprises a carriage movable along a linear path, a marker-frame slidably supported by said carriage, an actuating bar pivoted at one end for movement from a position parallel to the path of said carriage to a position at an angle with respect thereto, a crank interconnecting said carriage and said marker-frame, said crank having one end operatively engaging said actuating bar, a spring biasing said one end of said crank and said actuating bar toward each other, means associated with the opposite end of said actuating bar for applying the force of said spring in a direction to maintain said chart in tension and operable by contraction or expansion of said chart to fix the angular position of said actuating bar for introduction of a corrective movement of said marker-support by said crank.

6. Means for correcting the position of the marker with respect to graduations on a chart changed by expansion or contraction thereof, which comprises a carriage movable along a linear path, a marker-frame slidably supported by said carriage, an actuating bar pivoted at one end for movement from a position parallel to the path of said carriage to a position at an angle with respect thereto, a crank arm interconnecting said carriage and said marker-frame, said crank arm having one end operatively engaging said actuating bar, a spring biasing said one end of said crank arm and said actuating bar toward each other, a crank connected to the opposite end of said actuating bar, a spider engaging holes in the chart and operable by said crank for applying the force of said spring in a direction to maintain said chart in tension and movable upon contraction or expansion of said chart to fix the angular position of said actuating bar for introduction of a corrective movement of said marker-support by said crank arm.

7. Means for correcting the position of a marker with respect to graduations on a strip chart changed by expansion or contraction thereof, which comprises a roll for supporting said chart, a carriage movable along a path parallel to the axis of said roll, a marker-support slidably carried by said carriage, an actuating bar pivoted for movement from a position parallel to the path of said carriage to a position at an angle with respect thereto, a crank interconnecting said carriage and said marker-support, said crank having one end operatively engaging said actuating bar, a spring biasing said crank and said actuating bar toward each other, driving pins at one end of said roll for anchoring one side of said chart, said roll having a plurality of radial slots at the opposite end thereof, a plurality of spokes disposed within said slots for engaging holes in the chart, means associated with one end of said actuating bar for applying the force of said spring to said spokes in a direction to maintain said chart in tension and operable by contraction or expansion of said chart to fix the angular position of said actuating bar for introduction of a corrective movement of said marker-support by said crank.

FRANK F. DERN, JR.
ALBERT J. WILLIAMS, JR.

REFERENCES CITED

The following references are of record in the file of this patent:

UNITED STATES PATENTS

| Number | Name | Date |
|---|---|---|
| 1,927,401 | Gray | Sept. 19, 1933 |
| 1,927,402 | Harrison | Sept. 19, 1933 |
| 2,150,502 | Harrison et al. | Mar. 14, 1939 |
| 2,221,950 | Moore | Nov. 19, 1940 |

Certificate of Correction

Patent No. 2,432,229.  December 9, 1947.

FRANK F. DERN, JR., ET AL.

It is hereby certified that errors appear in the printed specification of the above numbered patent requiring correction as follows: Column 3, line 70, for "pin-support" read *pen-support*; column 4, line 45, for "The pin 45" read *The pen 45*; and that the said Letters Patent should be read with these corrections therein that the same may conform to the record of the case in the Patent Office.

Signed and sealed this 29th day of June, A. D. 1948.

[SEAL]

THOMAS F. MURPHY,
*Assistant Commissioner of Patents.*